Patented Apr. 27, 1948

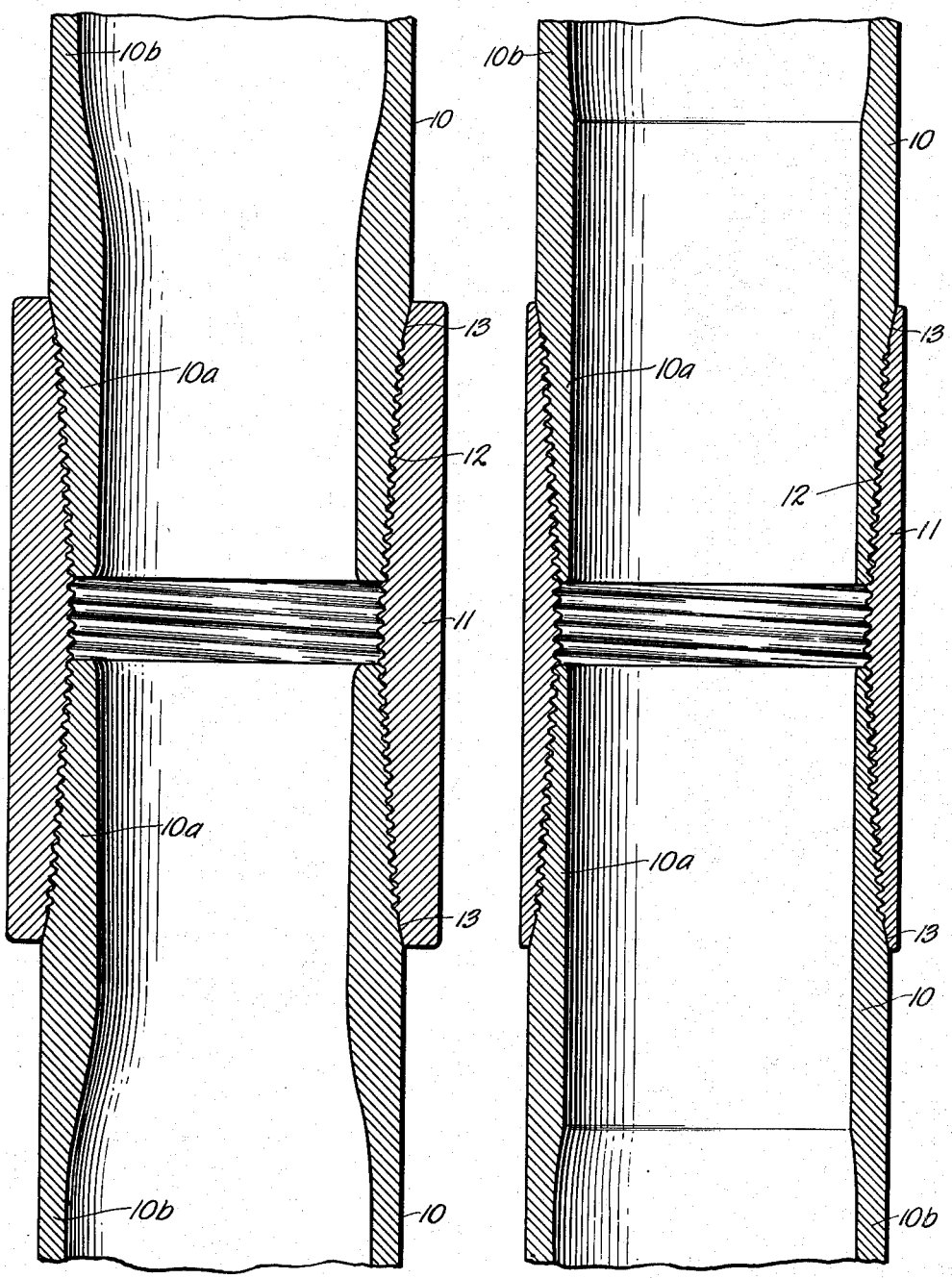

2,440,651

UNITED STATES PATENT OFFICE 2,440,651

TOOL JOINT

Alexander H. Bell, Los Angeles, Calif., assignor to Continental Oil Company, Ponca City, Okla., a corporation of Delaware Application September 18, 1943, Serial No. 502,899

2 Claims. (Cl. 285—146)

My invention relates to new and useful improvements in tool joints for oil well drill pipe.

When drilling an oil well the tool joints connecting the pipe sections of the drilling string are worn rapidly due to abrading or rubbing of the joints against the casing or the sides of the well bore. After the joints become badly worn the pipe cannot be used for drilling until the joints have been rebuilt to substantially their original dimensions. Since there are a great many joints in a drilling string, the time, labor, and money involved are considerable. Badly worn drill pipe is sometimes converted to liner or other type of oil well pipe requiring a flush or a substantially flush external joint. Since drill pipe is subjected to great torsional stresses, the threads on conventional drilling pipe begin at the outside diameter of the pipe and are tapered as little as possible so that a maximum thickness of metal is provided beneath the joint to avoid twist-offs which occur most frequently at the crest or inner end of the joint. The taper of the threads must be greater than in the case of ordinary pipe threads, however, in order that the stands of pipe will "stab" easily and "make and break" without thread damage while running in and out of the hole. A conventional drill pipe thread either lies too near the outside surface of the pipe to receive a coupling whose outer surface is flush with the pipe or too near the inner surface to permit the internal upset to be drilled out without cutting into the threads. Since the thread conventionally employed for drill pipe will not accommodate a flush joint or coupling, it is necessary to cut off and discard the threaded ends and to cut new threads which allow an internal flush joint to be made. After the new threads are cut the worn tool joints can either be rebuilt or junked and new couplings used to join the pipe sections. In any event, considerable time and labor are expended in removing the threaded ends of the pipe and in cutting the new threads. Moreover, the pipes are shortened by cutting off the ends and the discarded pieces represent waste.

I have developed a drill pipe having threaded ends of sufficient strength to withstand torsional stresses to which they are subjected and in which the threads are uniquely cut to accommodate either a tool joint or an externally flush joint or coupling. More specifically, the end portions of my improved drill pipe are internally upset to provide relatively thicker walls beneath the threads. The crests of the threaded portions lie substantially inwardly from the plane of the outer pipe surface and the pipe tapers gradually from its outer surface to the crests. Moreover, the threaded portions, themselves, are tapered more than conventional pipe threads.

The manner in which the threads are tapered and cut into the pipe permits an externally flush coupling to be screwed on the pipes. The internal upsets provide the requisite strength during drilling. Furthermore, I have found that the gradually increasing thickness of pipe above the crests of the threads absorbs torque shocks more efficiently than a shoulder or a sharp increase in thickness.

After a pipe embodying my invention becomes too worn to be used as drill pipe the internally upset ends can be drilled out to substantially the internal diameter of the pipe and the worn joints can be cut down to substantially the outside diameter of the pipe. This can be done quickly and easily. The converted drill pipe can then be used as liner or in any other capacity where a smooth inner bore of substantially uniform diameter is desirable and a flush or substantially flush external joint is required.

An important object of my invention is to provide a string of drill pipe that can be easily and inexpensively converted and used as a liner or in any other capacity as on oil well pipe where external flush joints are required, when the tool joints become worn, thereby saving on the original cost of the pipe and eliminating costly rebuilding of the worn joints.

Other objects and advantages of my invention will be apparent during the course of the following description.

In the drawing forming a part of this specification and wherein like numerals are employed to designate like parts throughout the same, Fig. 1 is a fragmentary longitudinal sectional view through a string of drill pipe embodying my invention;

Fig. 2 is a fragmentary longitudinal sectional view showing a string of drill pipe converted to make a liner for oil wells.

In the drawing, wherein is shown a preferred embodiment of my invention, attention is first directed to Fig. 1. The numeral 10 designates a pipe section. To make a string of drill pipe, pipe sections 10 are arranged in longitudinal alignment and their ends screwed into tubular joints or couplings 11. The end portions 10a of the pipe sections are internally upset to provide a greater thickness of metal beneath the threaded joint. However, the portions of increased thickness extend well beyond the crests or inner ends of the threads to strengthen the pipe and avoid twist-offs which frequently occur at this point.

Further novelty of the invention resides in the manner in which the threaded joint 12 between the respective pipes 10 and couplings 11 is positioned to provide a proper joint having maximum strength after the drill pipe has been converted. The joint is positioned so that it will still be centrally located between the inner wall of the pipe and the outer surface of the joint after the end portions 10a have been bored out to substantially the diameter of the intermediate portions 10b and the couplings 11 have been cut down so that they are substantially flush with the outer surface of the pipe sections. In Fig. 2 I have shown the drill pipe of Fig. 1 converted for use as liner or other similar pipe in an oil well. The joint 12 is preferably a coarse casing thread, the diameter at the crest of the thread being substantially less than the outside diameter of the pipe. From its outside surface the pipe tapers gradually as at 13 to the lesser diameter of the threads. As suggested, this gradual taper prevents or materially reduces the possibility of twist-offs since the torque shocks are better absorbed by a gradually increasing thickness of pipe than by a shoulder or sharp increase in thickness. I prefer that the threaded ends of the pipe sections have a taper of from 1¼ inches to 1½ inches per foot. This is enough taper to cause the stands of pipe to "stab" easily and to "make and break" without thread damage. Moreover, this degree of taper centrally locates the joint so that the internal upset of the pipe can be drilled out and the tool joint cut down without destroying any of the threads. If the tapered joint is not located in the center of the section it is mechanically impossible to either bore out the internal upset or to turn down the tool joint or coupling without destroying all or part of the threads.

I contemplate using drill pipe of the type shown in Fig. 1 until the couplings 11 become so worn that they must be either rebuilt or replaced, and then converting the worn drill pipe to use as a liner as shown in Fig. 2. As suggested, I further contemplate using the converted drill pipe in any other capacity where external flush or substantially flush joints are required. Of course, the life of a drilling string varies with the type of formations through which the well bore is drilled and the treatment and care the string is given during drilling operations. As an example, in one instance a 1500 foot section of drill pipe was used to drill four 6000 foot wells before the couplings 11 were so badly worn that rebuilding was necessary. Instead of expending time, labor and money in rebuilding the couplings 11 in the conventional manner, the thick end portions of the pipe sections were bored out and the worn couplings cut down as shown in Fig. 2. The 1500 foot drill pipe was then set as liner in the fourth well. This eliminated the cost of new pipe for the liner. By boring out the end portions 10a of the pipe sections an internal diameter substantially the same as conventional line is provided and by reducing the diameter of couplings 11 ample clearance for the liner is assured.

From the foregoing it is apparent that I have accomplished the objects of my invention. I have reduced the pitch diameter of the conventional drill pipe but have tapered the thread sufficiently so that it is suitable for tool joint use and, in addition, have uniquely located the thread centrally in the section so that it can be retained for use as a pipe coupling in casing or liner where flush joint pipe is needed by turning off the outside of the tool joint and boring out the inside of the upset.

It is to be understood that the form of the invention herewith shown and described is to be taken as a preferred example of the same and that various changes in the size, shape and arrangement of parts may be resorted to without departing from the spirit of my invention or the scope of the appended claims.

Having thus described my invention, I claim:

1. A tool joint for oil well drill pipes comprising aligning pipe sections, the end portions of the pipe sections being internally upset; a tubular collar or coupling surrounding and threadedly connected to the adjacent end portions of the pipe sections, the threaded joints between the respective pipes and couplings being tapered toward the ends of the pipe and positioned entirely between the inner and outer walls of the pipe sections, the pitch diameter of the narrow outer ends of the joints being sufficiently greater than the inside diameter of the pipe so that the internal upsets can be bored out without cutting into the threads, the pitch diameter of the joints at their crests or inner ends being substantially less than the outside diameter of the pipe, said pipe tapering gradually from its outer surface to the crests of the threads, and the internal terminal portions of said coupling being axially tapered complementary to the tapered outer surfaces on the ends of the pipe and of such diameter as to engage the tapered outer surfaces on the ends of the pipes.

2. In a joint device of the character described, a drill pipe convertible into a well casing section and having an end portion internally upset and externally threaded, the threaded portion being tapered toward the end of the pipe and positioned entirely between the inner and outer walls of the pipe, the pitch diameter of the narrow outer end being sufficiently greater than the inside diameter of the pipe that the internal upset can be bored out without cutting into the threads.

ALEXANDER H. BELL.

REFERENCES CITED

The following references are of record in the file of this patent:

UNITED STATES PATENTS

| Number | Name | Date |
|---|---|---|
| 1,364,478 | Boyd et al. | Jan. 4, 1921 |
| 1,889,867 | Montgomery | Dec. 6, 1932 |
| 1,889,870 | Montgomery | Dec. 6, 1932 |
| 2,308,066 | Evans | Jan. 12, 1943 |

FOREIGN PATENTS

| Number | Country | Date |
|---|---|---|
| 380,450 | Great Britain | Sept. 13, 1932 |
| 392,827 | Great Britain | May 25, 1933 |